United States Patent [19]

Tessler et al.

[11] Patent Number: 4,540,778
[45] Date of Patent: * Sep. 10, 1985

[54] SULFOSUCCINATE, ALKYL- AND ALKENYL SULFOSUCCINATE, SULFOMALEATE, AND DISULFOSUCCINATE HALF-ESTERS OF POLYGALACTOMANNANS

[75] Inventors: Martin M. Tessler, Edison; Teresa A. Dirscherl, North Plainfield; Otto B. Wurzburg, Whitehouse Station, all of N.J.

[73] Assignee: National Starch and Chemical Corporation, Bridgewater, N.J.

[*] Notice: The portion of the term of this patent subsequent to Jun. 7, 2000 has been disclaimed.

[21] Appl. No.: 618,854

[22] Filed: Jun. 8, 1984

[51] Int. Cl.$^3$ ............................................. C08B 37/00
[52] U.S. Cl. .................................................... 536/114
[58] Field of Search ........................................ 536/114

[56] References Cited

U.S. PATENT DOCUMENTS

| | | | |
|---|---|---|---|
| 3,507,855 | 4/1970 | Whistler | 536/107 |
| 3,720,659 | 3/1973 | Guiseley et al. | 536/107 |
| 3,914,214 | 10/1975 | Trimnell et al. | 536/107 |
| 4,379,919 | 4/1983 | Tessler et al. | 536/108 |
| 4,387,221 | 6/1983 | Tessler et al. | 536/107 |

*Primary Examiner*—Ronald W. Griffin
*Attorney, Agent, or Firm*—Edwin M. Szala; Margaret B. Kelley

[57] ABSTRACT

Sulfosuccinate polygalactomannan half-esters, as well as the alkyl- and alkenyl-sulfosuccinates thereof, are prepared by reacting the gum with sulfosuccinic anhydride or a $C_1$–$C_{22}$-alkyl- or $C_3$–$C_{22}$-alkenyl sulfosuccinic anhydride. The reactions are carried out at about pH 7.5 in a two-phase system of solid gum slurried in an aqueous medium containing a water-miscible solvent. Sulfomaleate half-esters are prepared in a similar manner using sulfomaleic anhydride. Disulfosuccinate half-esters are prepared by reacting the sulfomaleate gum half-ester with sulfurous acid or a bisulfite salt such as sodium bisulfite.

20 Claims, No Drawings

SULFOSUCCINATE, ALKYL- AND ALKENYL SULFOSUCCINATE, SULFOMALEATE, AND DISULFOSUCCINATE HALF-ESTERS OF POLYGALACTOMANNANS

BACKGROUND OF THE INVENTION

This invention relates to novel sulfur-containing half-esters of polygaloctomannan gums and to methods for their preparation using sulfosuccinic anhydride, alkyl- and/or alkenyl sulfosuccinic anhydride, and sulfomaleic anhydride.

Polygalactomannan ether derivatives are well-known in the art and are useful in the petroleum industry as oil well drilling muds and oil well fracturing aids, in the textile industry for sizing, printing, and finishing operations, and in the paper industry as beater additives. Typical derivatives may contain non-ionic groups, such as $C_3$–$C_8$-hydroxyalkyl groups; anionic groups, such as carboxyalkyl groups; cationogenic groups, such as diethylaminoethyl groups; cationic groups, such as quaternized amine groups; and mixed ether groups, such as carboxyalkyl and hydroxyalkyl groups.

SUMMARY OF THE INVENTION

The present invention provides in one embodiment novel sulfosuccinate half-ester derivatives and alkyl- and alkenyl-sulfosuccinate half-ester derivatives of polygalactomannan gums having the following general structure:

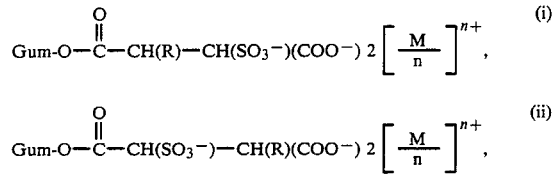

or mixtures of (i) and (ii); wherein Gum-O- represents a gum molecule or modified gum molecule (where the hydrogen of a hydroxyl group of a mannopyranosyl or galactopyranosyl unit has been replaced as shown); R is a hydrogen, a $C_1$-$C_{22}$ straight or branched chain alkyl group or mixtures thereof, a $C_3$-$C_{22}$ straight or branched chain alkenyl group or mixtures thereof, or a mixture of alkyl- and alkenyl-groups; M is a cation; and n is the valence number of M.

It also provides in another embodiment novel polygaloctomannan sulfomaleate half-ester derivatives having the following general structure:

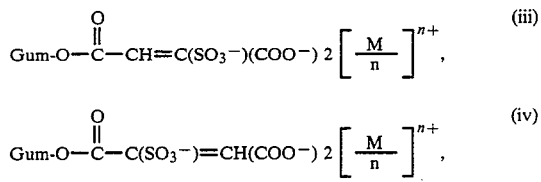

or mixtures of (iii) and (iv), wherein Gum-O, M, and n are as defined herein above.

It further provides in another embodiment novel polygaloctomannan disulfosuccinate half-ester derivatives having the following general structure:

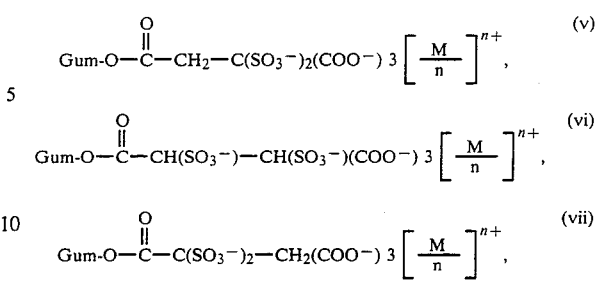

or mixtures of (v), (vi), and (vii), wherein Gum-O, M, and n are as defined hereinabove.

The sulfosuccinate and sulfomaleate half-ester derivatives are prepared by reacting a polygalactomannan gum base with about 0.1-100% by weight, based on dry gum, of a suitable anhydride reagent and isolating the derivative. The reactions are carried out at a pH of about 7.5 in a two-phase system of solid gum slurried in an aqueous medium containing a water-miscible solvent. The reaction time is about 3-16 hours depending upon the reagent used. The reaction temperature is ambient temperature. The reagents used are sulfosuccinic anhydride for the preparation of the sulfosuccinate half-ester derivative, $C_1$-$C_{22}$-alkyl- or $C_3$-$C_{22}$-alkenyl sulfosuccinic anhydrides for the preparation of the alkyl- or alkenyl sulfosuccinate half-ester derivatives, and sulfomaleic anhydride for the sulfomaleate half-ester derivative.

The disulfosuccinate half-ester derivatives are prepared by reacting the sulfomaleate half-ester derivative with about 0.1-400%, preferably 10-50%, by weight, based on the dry gum, of sulfurous acid or the acid salt thereof (e.g., sodium, potassium, or ammonium bisulfite).

The half-esters herein may be modified to increase their anionic characteristics by the introduction of additional anionic substituent groups. They may be modified to render them amphoteric by the introduction of cationic or cationogenic substituent groups. They may also be modified by the introduction of zwitterionic substituent groups or nonionic substituent groups.

The gum half-esters herein may be used as pigment retention aids in papermaking and in other applications where anionic gum derivatives are typically used such as the oil and gas, textile, explosives and mining industries.

DESCRIPTION OF THE PREFERRED EMBODIMENTS

The esterification process herein is applicable to "polygalactomannans", herein defined as heteropolysaccharides composed principally of long chains of 1→4β-D-mannopyranosyl units to which single unit side chains of α-D-galactopyranosyl units are joined by 1→6 linkages and hereafter referred to as "gums". They are commonly found in the endosperm of certain seeds of the plant family "Leguminosae," such as seeds of guar, locust bean, honey locust, flame tree and the like. The gum suitable for use herein may be in the form of endosperm "splits" or preferably purified or unpurified ground endosperm (generally called flour) derived from the splits. Also included are gum degradation products resulting from the hydrolytic action of acid, heat, shear, and/or enzymes; oxidized gums; derivatized gums such as ethers and esters containing non-ionic, anionic, cationogenic and/or cationic groups, and other typical carbohydrate modifications.

The preferred gums are guar gums and locust bean gum because of their commercial availability. Guar gum is essentially a straight chain polygalactomannan wherein the branching takes place on alternate mannopyranosyl units thus providing a galactopyranosyl to mannopyranosyl ratio of 1:2. Locust bean gum has a similar structure wherein the galactopryranosyl to mannopyranosyl ratio is 1:4 but wherein the branching is not uniformly spaced.

The alkyl- and/or alkenyl-sulfosuccinic anhydrides which react with the gum base to form the gum derivatives containing alkyl- and/or alkenyl-sulfosuccinate groups, may be prepared using the sulfonation procedure described in U.S. Pat. No. 3,706,771 issued Dec. 19, 1972 to F. J. Kremers et al. In carrying out the sulfonation reaction, the alkyl- or alkenyl-succinic anhydride is dissolved in an anhydrous solvent reaction medium inert to the action of sulfur trioxide. Then liquid sulfur trioxide, dissolved in the same or a different anhydrous solvent, is added slowly to the alkyl- or alkenyl-succinic anhydride solution. The sulfur trioxide is employed in a ratio of at least about 1 mole, preferably 1.1 to 1.5 moles, per mole of alkyl- or alkenyl-succinic anhydride. The mixture is agitated and maintained at between about $-5°$ to $35°$ C., preferably at ambient temperature, until the reaction is complete, typically about 15 minutes to 3 hours. The resulting anhydride is recovered by evaporating off the solvent. Suitable solvents include methylene chloride, trichloromonofluoromethane, trichlorotrifluoroethane, hexane, heptane, and preferably 1,2-dichloroethane.

The sulfosuccinic anhydride, which is used in the preparation of gum sulfosuccinate, may be prepared by sulfonating succinic anhydride using the above procedure except that it is not necessary to dissolve the anhydride in solvent, in which case the reaction mixture is kept in an ice bath during the sulfur trioxide addition.

The sulfomaleic anhydride which reacts with the gum bases to form the gum sulfomaleates herein may be prepared using the sulfonation procedure of A. LeBerre, A. Etienne, and J. Coquelin, described in Bulletin Soc. Chim. Fr., No. 1, p. 214 (1973) or the procedure described in U.S. Pat. No. 3,987,043 issued Oct. 19, 1976 to V. Lamberti. In carrying out the sulfonation reaction, liquid sulfur trioxide is added slowly to the maleic anhydride. The sulfur trioxide is employed in a ratio of at least about 1 mole, preferably 1.1 to 1.5 moles, per mole of maleic anhydride. The above gum reactions are represented by the following equation

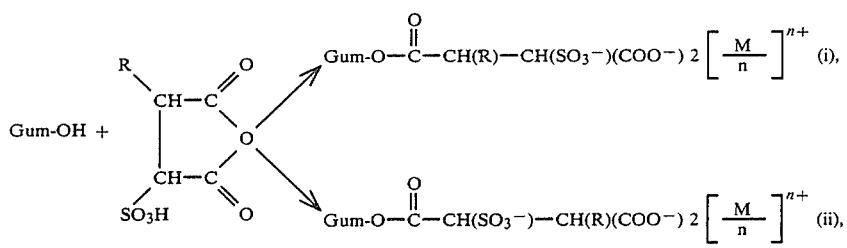

or mixtures of (i) and (ii)}.

The gum reactions with sulfomaleic anhydride to form the gum sulfomaleates herein are represented by the following equations:

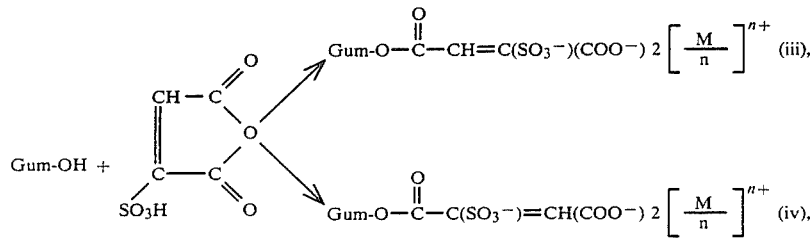

or mixture of (iii) and (iv).

The reactions of the gum sulfomaleates, i.e. (iii), (iv), or mixtures thereof with a bisulfite, (e.g. sodium bisulfite), to form the gum disulfosuccinates herein are represented by the following equations:

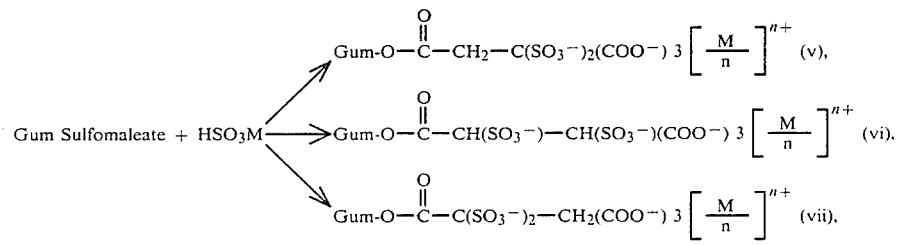

or mixtures of (v), (vi) and (vii).

Gum is defined as hereinabove; M is defined as hereinabove and M may be the same or different cation, preferably selected from the group consisting of hydrogen, ammonium, an alkali or an alkaline earth metal, and a protonated tertiary amine; R is as defined hereinabove with the alkenyl groups preferably having the formula —CH$_2$CH=CH(CH$_2$)$_n$CH$_3$ (n=0–18) and, when branched, preferably having the formulas —CH(CH$_2$—R$^1$)—CH=CH—R$^2$ or —CH$_2$—C(=CH—R$^2$)—CH$_2$—R$^1$, where R$^1$ and/or R$^2$ are alkyl groups containing a total of up to 18 carbon atoms; and n is as defined hereinabove.

The practitioner will recognize that these gum half-esters may be either acids, salts, or partial salts depending upon the pH of the solution wherein they are used. The practitioner will also recognize that the gum molecule is a polymer which contains many anhydro sugar units, each having on the average three available hydroxyl sites which may react with the reagent. Thus, the number of such displacements or the degree of substitution will vary with the particular gum, the ratio of reagent to gum, and, to some extent, the reaction conditions. Furthermore, since it is known that the relative reactivity of each of the hydroxyl groups within the anhydro sugar unit is not equivalent, it is probable that some will be more reactive with the reagent than others.

In the method herein, the reaction is carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative.

The water-miscible solvent is added in the amount sufficient for the preparation of a slurry which can be agitated and pumped. The weight ratio of water-miscible solvent to gum may vary from 1:1 to 10:1, preferably from 1.5:1 to 5:1.

Suitable water-miscible solvents include alkanols, glycols, cyclic and acylic alkyl ethers, alkanones, dialkylformamide and mixtures thereof. Typical solvents include methanol, ethanol, isopropanol, secondary pentanol, ethylene glycol, acetone, methyethylketone, diethylketone, tetrahydrofuran, dioxane, and dimethylformamide.

The reaction is carried out at about 20° to 45° C., preferably ambient temperature (about 25° C.). The reaction mixture is preferably agitated. Reaction time may vary from about 3 to 16 hours, depending on such factors as the amount of reagent employed, the temperature, the scale of the reaction, and the degree of substitution desired. The pH is maintained at about 7.5 during the reagent addition and during the entire reaction using a base, such as sodium hydroxide, calcium hydroxide and the like, in the mixed water/solvent system.

After completion of the reaction the excess alkali is neutralized and the pH is adjusted to about 5.5 with an acid such as hydrochloric acid, sulfuric acid, acetic acid and the like, conveniently added as a dilute solution.

After completion of the esterification reaction, the solid gum half-ester derivatives are separated from the reaction mixture by centrifugation or filtration. Preferably, the derivative is purified by washing with the same aqueous solution of water-miscible solvent as previously employed in the reaction and by further washing with a more anhydrous form of the same solvent and then dried.

In addition to preparing the above half-ester derivatives, modified gum derivatives may be prepared which contain other substituent groups, such as hydroxypropyl ether groups (see U.S. Pat. No. 3,723,408 issued Mar. 27, 1973 to R. Nordgren et al. for the preparation of derivatives containing such groups); carboxyalkyl ether groups (see U.S. Pat. Nos. 2,477,544 issued July 26, 1949 and 2,520,161 issued Aug. 29, 1950 to O. A. Moe for the preparation of derivatives containing such groups); tertiary amino groups, such as diethylaminoethyl ether groups (see Federal Register 28 3695 Apr. 16, 1963 for a discussion of such derivatives); and quarternary amine groups, such as 3-(trimethylammonium chloride)-2-hydroxypropyl groups or 4-(trimethylammonium chloride)-2-butenyl groups (see U.S. Pat No. 3,981,686 issued Sept. 21, 1976 to W. Lobunez and U.S. Pat. No. 4,031,307 June 21, 1977 to R. N. DeMartino et al., respectively, for the preparation of such derivatives).

There are three possible ways to prepare the modified gum derivatives: (1) a non-ionic, anionic, cationogenic or cationic gum ether derivative may be reacted with the anhydride reagent; (2) the anionic gum ester derivative containing the half-ester groups may be reacted with a non-ionic, anionic, cationogenic or cationic reagent(s); (3) a gum base may be reacted in one-step with the anhydride reagent and a non-ionic, anionic, catinogenic or cationic reagent(s). However, since gum esters are not very stable at high pH, the modified gums must be prepared by method (1) to avoid ester hydrolysis under the alkaline conditions required to prepare gum ether derivatives. The reactions to introduce the substituent groups are carried out in the presence of excess alkali using the two phase reaction system previously discussed.

It can be appreciated by the practitioner that a large number of variations may be effected in selecting the non-ionic, anionic, cationogenic or cationic reagents and in reacting the gum with the anhydride reagents and other reagents in accordance with the reaction procedures described above without materially departing from the scope and spirit of the invention. Such variations will be evident to those skilled in the art and are to be included within the scope of this invention.

The following examples will more fully illustrate the embodiments of this invention. In the examples, all parts and percentages are given by weight except for the mixed solvent which is by volume. All temperatures are in degrees Celsius unless otherwise noted. The sulfur content of the gum derivatives was determined using a LECO ® automatic sulfur analyzer (registered trademark of LECO Corp.). The nitrogen content of the amphoteric polysubstituted gum derivatives was determined by the Kjeldahl method.

EXAMPLE I

This example illustrates the preparation of an alkylsulfosuccinate guar gum derivative.

Sulfooctadecyl succinic anhydride was prepared using the sulfonation procedure of U.S. Pat. No. 3,706,771 (cited previously). The anhydride was dissolved in 1,2-dichloroethane and liquid sulfur trioxide (100 mole %) dissolved in 1,2-dichloroethane was slowly added to the agitated anhydride solution at ambient temperature (about 25° C.). After the sulfonation was complete, the solvent was removed using a rotary evaporator.

About 100 parts of guar gum flour was slurried in 300 ml. of an 80/20 isopropanol/water mixture. The suspension was stirred and the pH was adjusted to and maintained at 7.5 by the addition of 80/20 isopropanol/5% aqueous sodium hydroxide while the reagent was added over 15 minutes. The reaction mixture was allowed to react for 16 hours at ambient temperature (about 25° C.) and agitation was continued. The pH was adjusted to 5.5 with an aqueous 25% citric acid solution. The reaction product was recovered by filtration, washed twice with the 80/20 isopropanol/water solution, filtered, resuspended in 90% acetone, adjusted to pH 1 with 3:1 aqueous HCl, filtered, resuspended in 80/20 isopropanol, adjusted to pH 5.5 with 5% aqueous sodium hydroxide, filtered, dried, and the initial sulfur content was determined. The % reagent and sulfur content of the derivatives are given below.

| Derivative | Sulfooctadecyl Succinic Anydride (%) | Sulfur Content (%) Initial | After Resuspension And Further Washing |
|---|---|---|---|
| Guar Gum (control) | — | 0.039 | 0.035 |
| Guar Gum Succinate | 50 | 1.023 | 0.540 |

The results show that the derivative contained more sulfur than the control even after an additional washing to remove residual reagent.

EXAMPLE II

This example illustrates the preparation of sulfomaleate guar gum derivatives and their reaction with bisulfite to form the disulfosuccinate guar gum derivatives.

Part A

The sulfomaleic anhydride reagent was prepared using the sulfonation procedure of U.S. Pat. No. 3,987,043 (cited previously). Liquid sulfur trioxide (100 mole %) was added slowly to the agitated maleic anhydride powder while heating to maintain the temperature at 60° C. After the exothermic reaction was complete, the reaction temperature was raised to 100°–110° C. and the mixture was held for 3 hours. After cooling to room temperature, the viscous dark brown oil crystallized to solid sulfomaleic anhydride.

The reaction was carried out as in Example I except that the reagent was added over 12 and 45 minutes and the reaction time was 3 hours. The reaction product was washed twice with 80/20 isopropanol/water, three times with isopropanol, filtered, resuspended in 90% isopropanol, filtered and dried. In order to remove additional residual reagent the product was dispersed in water to solubilize the gum derivative, dialyzed for about 16 hours, and precipitated out with ethanol. The sulfur was then determined. The % reagent, reagent addition time, and sulfur content are are given below.

| Derivative | Sulfomaleic Anhydride Amount (%) | Addition Time (min.) | Sulfur Content (%) |
|---|---|---|---|
| Guar Gum (control) | — | — | 0.0349 |
| Guar Gum Sulfomaleate | 10 | 12 | 0.363 |
| Guar Gum Sulfomaleate | 50 | 45 | 0.456 |

The results show that the derivatives contained more sulfur than the control.

Part B

A total of about 7 parts of the above sulfomaleate guar gum derivatives was slurried in 50 parts of an 80/20 isopropanol/water mixture and the pH adjusted to 7.5 with 5% aqueous sodium hydroxide. The indicated amounts of sodium bisulfite were added to the gum slurry, and the reaction mixture was stirred at room temperature for 2 hours. The pH was then raised from 3.9 to 5.5 with 3% aqueous sodium hydroxide, and the reaction product recovered in the same manner as above. The % reagent (based on the sulfomaleate) and sulfur content of the derivatives are given below.

| Derivative | Sodium Bisulfite (%) | Sulfur Content (%) Initial | After Reaction* |
|---|---|---|---|
| Guar Gum Disulfosuccinate | 10 | 0.363 | 0.642 |
| Guar Gum Disulfosuccinate | 50 | 0.456 | 0.921 |

*The theoretical sulfur contents are 0.726% and 0.912%, respectively. The derivative containing 0.921% sulfur probably still contained a slight amount of residual reagent.

EXAMPLE III

This example illustrates the preparation of sulfomaleate guar gum derivatives containing hydroxypropyl ether groups and the reaction thereof with bisulfite to form the disulfosuccinate derivative.

A hydroxypropyl guar gum derivative with a degree of substitution (D.S.) of approximately 0.6 was reacted with sulfomaleic anhydride and then with sodium bisulfite using the procedures of Example II. The products were purified in the same manner. The % reagent and sulfur content are given below.

| Derivative | Reagent | Sulfur Content (%) |
|---|---|---|
| Hydroxypropyl Guar Gum (control) | — | 0.00605 |
| Hydroxypropyl Guar Gum Sulfomaleate | 25% Sulfomaleic anhydride | 0.279 |
| Hydroxypropyl Guar Gum Sulfomaleate | 50% Sulfomaleic anhydride | 0.311 |
| Hydroxypropyl Guar Gum Disulfosuccinate | 50% Sodium Bisulfite | 0.561* |

*Prepared from the sulfomaleate derivative containing 0.311% S. The theoretical sulfur content is 0.662%.

Summarizing, this invention provides novel sulfur-containing polygalactomannan half-esters and methods for their preparation.

Now that the preferred embodiments of the present invention are described in detail, various modifications and improvements thereon will become readily apparent to those skilled in the art. Accordingly, the spirit and scope of the invention are to be limited only by the appended claims, and not by the foregoing specification.

What is claimed is:

1. A polygalactomannan gum derivative, comprising a gum sulfosuccinate half-ester of the general structure:

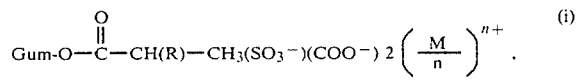

-continued

 (ii)

or mixtures of (i) and (ii), wherein Gum-O- represents a gum molecule or a modified gum molecule; R is hydrogen or a $C_1$-$C_{22}$ straight or branched chain alkyl group or mixtures thereof, a $C_3$-$C_{22}$ straight or branched chain alkenyl group or mixtures thereof, or a mixture of the alkyl and alkenyl groups; M is a cation; and n is the valence of M.

2. The derivative of claim 1, wherein M is hydrogen, ammonium, an alkali or an alkaline earth metal, or a protonated tertiary amine.

3. The derivative of claim 2, wherein M is sodium, potassium, or calcium.

4. The derivative of claim 1, wherein the modified gum molecule contains cationic, cationogenic, anionic, or nonionic substituent groups.

5. The derivative of claim 4, wherein the cationic or cationogenic groups are diethylaminoethyl ether groups or 3-(trimethylammonium chloride)-2-hydroxypropyl ether groups; the anionic groups are carboxymethyl ether groups; and the nonionic groups are hydroxypropyl ether groups.

6. The derivative of claim 1, wherein the straight chain alkenyl group has the formula $-CH_2-CH=CH(-CH_2)_n-CH_3$, where n is 0-18, and the branched alkenyl group has the formula $-CH(-CH_2-R^1)-CH=CH-R^2$ or $-CH_2-C(=CH-R^2)-CH_2-R^1$, where $R^1$ and $R^2$ are hydrogen or one or more alkyl groups containing a total of up to 18 carbon atoms.

7. The derivative of claim 6, where the alkenyl groups are octenyl, dodecenyl, or $C_{15}$-$C_{20}$ mixed, branched alkenyl.

8. The derivative of claim 1, which is prepared by reacting a gum base or modified gum base with about 0.1 to 100% by weight, based on dry gum of a sulfonated succinic anhydride reagent or of sulfonated alkyl- or alkenyl-succinic anhydride reagent and isolating the resulting gum ester(s), said sulfonated anhydride reagent being prepared by reacting succinic anhydride or a $C_1$-$C_{22}$ straight or branched chain alkyl succinic anhydride, or a $C_3$-$C_{22}$ straight or branched chain alkenyl succinic anhydride, or mixtures thereof with liquid sulfur trioxide in an organic solvent.

9. A polygalactomannan gum derivative, comprising a gum sulfomaleate half-ester of the general structure:

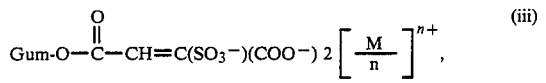 (iii)

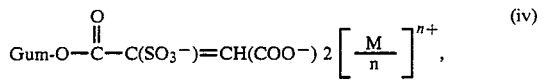 (iv)

or mixtures of (iii) and (iv), wherein Gum-O- represents a gum molecule or a modified gum molecule, M is a cation, and n is the valence number of M.

10. The derivative of claim 9, wherein M is hydrogen, ammonium, an alkali or an alkaline earth metal.

11. The derivative of claim 10 wherein M is sodium or potassium.

12. The derivative of claim 9, wherein the modified gum molecule contains cationic, anionic, or nonionic substituent groups.

13. The derivative of claim 12, wherein the cationic or cationogenic groups are diethylaminoethyl ether groups or 3-(trimethylammonium chloride)-2-hydroxypropyl ether groups; the anionic groups are carboxymethyl ether groups; and the nonionic groups are hydroxypropyl ether groups.

14. The gum derivative of claim 9, which is prepared by reacting a gum base or a modified gum base with about 0.1 to 100% by weight, based on dry gum, of sulfomaleic anhydride and isolating the resultant gum sulfomaleate.

15. A polygolactomannan gum derivative, comprising a gum disulfosuccinate half-ester of the general structure:

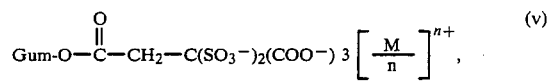 (v)

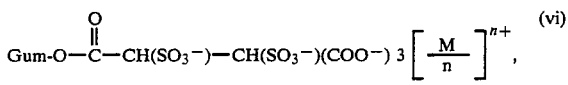 (vi)

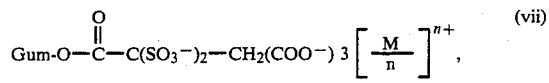 (vii)

or mixtures of (v), (vi), and (vii); wherein Gum-O- represents a gum molecule or a modified gum molecule, M is a cation, and n is the valence number of M.

16. The derivative of claim 15, wherein M is sodium or potassium.

17. The derivative of claim 15, wherein the modified gum molecule contains cationic, cationogenic, anionic, or nonionic substituent groups.

18. The derivative of claim 17, wherein the cationic or cationogenic groups are diethylaminoethyl ether groups or 3-(trimethylammonium chloride)-2-hydroxypropyl ether groups; the anionic groups are carboxymethyl ether groups; and the nonionic groups are hydroxypropyl ether groups.

19. The gum derivative of claim 15, which is prepared by reacting a gum base or a modified gum base with about 0.1 to 100% by weight, based on dry gum, of sulfomaleic anhydride, reacting the resultant gum sulfomaleate with about 0.1 to 400% by weight, based on dry gum, of sulfurous acid or the acid salts thereof, and isolating the resultant gum disulfosuccinate or mixtures of disulfosuccinate and gum sulfomaleate.

20. The gum derivative of claim 19, wherein the gum sulfomaleate is reacted with about 10-50% sodium bisulfite.

* * * * *